United States Patent
Drake et al.

(10) Patent No.: US 9,163,843 B2
(45) Date of Patent: Oct. 20, 2015

(54) WEAR-LEVELING FOR COMPONENTS OF AN AUXILIARY HEAT SOURCE

(71) Applicant: Trane International Inc., Piscataway, NJ (US)

(72) Inventors: Dean Alan Drake, Tyler, TX (US); Daniel John Blair, Tyler, TX (US)

(73) Assignee: Trane International Inc., Piscataway, NJ (US)

( * ) Notice: Subject to any disclaimer, the term of this patent is extended or adjusted under 35 U.S.C. 154(b) by 0 days.

(21) Appl. No.: 14/593,693

(22) Filed: Jan. 9, 2015

(65) Prior Publication Data

US 2015/0122901 A1 May 7, 2015

Related U.S. Application Data

(63) Continuation of application No. 13/016,329, filed on Jan. 28, 2011, now Pat. No. 8,967,490.

(51) Int. Cl.
| | |
|---|---|
| F24D 12/02 | (2006.01) |
| F24D 19/10 | (2006.01) |
| F24D 5/12 | (2006.01) |
| F24F 1/00 | (2011.01) |
| F24F 3/153 | (2006.01) |
| F24D 15/04 | (2006.01) |
| F24D 19/00 | (2006.01) |
| F24F 11/00 | (2006.01) |

(52) U.S. Cl.
CPC *F24D 12/02* (2013.01); *F24D 5/12* (2013.01); *F24D 15/04* (2013.01); *F24D 19/0095* (2013.01); *F24D 19/1087* (2013.01); *F24D 19/1096* (2013.01); *F24F 1/0007* (2013.01); *F24F 3/153* (2013.01); *F24D 2200/32* (2013.01); *F24F 2011/0052* (2013.01)

(58) Field of Classification Search
CPC .. F24F 1/0007; F24F 2011/0052; F24D 5/12; F24D 12/02; F24D 19/1087; F24D 19/1096; F24D 2200/32
See application file for complete search history.

(56) References Cited

U.S. PATENT DOCUMENTS

| | | | |
|---|---|---|---|
| 3,513,662 A | 5/1970 | Golber | |
| 3,766,745 A | 10/1973 | Quick | |
| 4,031,406 A | 6/1977 | Leyde et al. | |

(Continued)

FOREIGN PATENT DOCUMENTS

| | | | |
|---|---|---|---|
| CN | 101307973 A | 11/2008 | |
| CN | 101893383 A | 11/2010 | |

(Continued)

OTHER PUBLICATIONS

Drake, Dean Alan, et al.; U.S. Appl. No. 13/016,329, filed Jul. 31, 2014; Title: Wear-Leveling for Components of an Auxiliary Heat Source.

(Continued)

*Primary Examiner* — Jonathan Bradford
(74) *Attorney, Agent, or Firm* — Conley Rose, P.C.; J. Robert Brown, Jr.; Michael J. Schofield

(57) ABSTRACT

In at least some embodiments, an air handler includes a coil and a fan. The air handler also includes an auxiliary heat source having a plurality of heat elements. The auxiliary heat source implements a wear-leveling algorithm to cycle use of the heat elements over multiple auxiliary heat cycles.

21 Claims, 4 Drawing Sheets

(56) References Cited

U.S. PATENT DOCUMENTS

| | | |
|---|---|---|
| 5,123,256 A | 6/1992 | Oltman |
| 5,332,028 A | 7/1994 | Marris |
| 5,701,750 A | 12/1997 | Ray |
| 6,176,306 B1 | 1/2001 | Gault |
| 7,104,462 B2 | 9/2006 | Shearer |
| 7,603,204 B2 | 10/2009 | Patterson et al. |
| 2004/0065095 A1 | 4/2004 | Osborne et al. |
| 2007/0092618 A1 | 4/2007 | Burnell et al. |

FOREIGN PATENT DOCUMENTS

| | | |
|---|---|---|
| CN | 101957136 A | 1/2011 |
| GB | 2428470 A | 1/2007 |
| JP | 54037944 A | 3/1979 |
| JP | 59100333 A | 6/1984 |
| WO | 9412998 A1 | 6/1994 |
| WO | 9910684 A1 | 3/1999 |
| WO | 2005121650 A1 | 12/2005 |

OTHER PUBLICATIONS

PCT International Search Report; PCT Application No. PCT/US2012/022189; Jul. 2, 2012; 4 pages.

PCT Written Opinion of the International Searching Authority; PCT Application No. PCT/US2012/022189; Jul. 2, 2012; 6 pages.

Office Action dated Mar. 4, 2014; U.S. Appl. No. 13/016,329, filed Jan. 28, 2011; 12 pages.

Final Office Action dated Jul. 10, 2014; U.S. Appl. No. 13/016,329, filed Jan. 28, 2011; 9 pages.

Advisory Action dated Aug. 15, 2014; U.S. Appl. No. 13/016,329, filed Jan. 28, 2011; 3 pages.

Advisory Action dated Oct. 9, 2014; U.S. Appl. No. 13/016,329, filed Jan. 28, 2011; 5 pages.

Notice of Allowance dated Oct. 24, 2014; U.S. Appl. No. 13/016,329, filed Jan. 28, 2011; 8 pages.

Chinese Office Action; Application No. 201280006711.9; Jun. 3, 2015; 14 pages.

WEAR-LEVELING FOR COMPONENTS OF AN AUXILIARY HEAT SOURCE

CROSS-REFERENCE TO RELATED APPLICATIONS

This is a continuation application of the prior filed and co-pending U.S. patent application Ser. No. 13/016,329 filed on Jan. 28, 2011 by Dean Alan Drake, et. al., entitled "Wear-Leveling for Components of an Auxiliary Heat Source," the disclosure of which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

In a heat pump and refrigeration cycle, refrigerant alternately absorbs and rejects thermal energy as it circulates through the system and is compressed, condensed, expanded, and evaporated. In particular, a liquid refrigerant flows from a condenser, through an expansion device (e.g., expansion valve) and into an evaporator. As the refrigerant flows through the expansion device and evaporator, the pressure of the refrigerant decreases, the refrigerant phase changes into a gas, and the refrigerant absorbs thermal energy. From the evaporator, the gaseous refrigerant proceeds to a compressor, and then back to the condenser. As the refrigerant flows through the compressor and condenser, the pressure of the refrigerant is increased, the refrigerant phase changes back into a liquid, and the refrigerant gives up thermal energy. The process is implemented to emit thermal energy into a space (e.g., to heat a house) or to remove thermal energy from a space (e.g., to air condition a house). To summarize, a heat pump is an air conditioner that reverses the process of removing heat from the inside of the house (e.g., during summer) to absorbing the heat from outside air and moving it inside (e.g., during winter).

A heat pump is usually effective by itself down to temperatures around 25 to 30 degrees Fahrenheit. At lower temperatures, a gas furnace or auxiliary electric heat may be used to assist the heat pump. In other words, a heat pump may operate simultaneously with auxiliary electric heat. Additionally, the auxiliary electric heat may also be used as emergency heat in the event a heat pump needs service.

Under normal operating conditions, auxiliary electric heat is activated automatically by the thermostat when the indoor temperature drops during heat pump operation. There are also times during cold, wet weather when the outdoor coil may ice up and the heat pump will go into a defrost cycle. The defrost cycle reverses the heating process (i.e., the air conditioning process is activated) causing the outdoor coil to heat and melt any ice. The defrost cycle may last a few minutes and then the heating process is activated again. During the defrost cycle, the auxiliary electric heat may be activated since the heat pump is producing cold air at the internal coil.

The heat elements and other components used for auxiliary electric heat operations have a limited lifespan. Thus, efforts to improve the performance/durability of components for auxiliary electric heat operations and/or to decrease their frequency of use are desirable.

SUMMARY OF THE INVENTION

In at least some embodiments, an air handler is disclosed as comprising: an auxiliary heat source having a plurality of heat element relays, wherein each heat element relay is associated with at least one heat element; and a controller configured to: receive a heat request from a thermostat; access wear-tracking information for each of the plurality of heat element relays, wherein the wear-tracking information comprises the number of auxiliary heat cycles for which each of the plurality of heat element relays has been energized; generate a control signal to energize a first heat element relay of the plurality of heat element relays that comprises the lowest number of auxiliary heat cycles for which the first heat element has been energized; and determine whether a heat element fault exists, wherein in response to determining that a heat element fault exists, generating, by the controller, a control signal to energize a next heat element relay of the plurality of heat element relays that comprises the next lowest number of auxiliary heat cycles for which the next heat element relay has been energized.

In at least some embodiments, a control system for an auxiliary heat source of an air handler is disclosed as comprising: a thermostat interface configured to receive a heat request from a thermostat and to determine an auxiliary heat cycle responsive to the heat request; wear-leveling logic coupled to the thermostat interface, wherein the wear-leveling logic is configured to access wear-tracking information for each of a plurality of heat element relays, each heat element relay being associated with at least one heat element, and wherein the wear-leveling logic is configured to generate a control signal to energize a first heat element relay of the plurality of heat element relays that comprises the lowest number of auxiliary heat cycles for which the first heat element relay has been energized; and fault-handling logic, wherein the fault-handling logic is configured to determine whether a heat element fault exists; wherein in response to the fault-handling logic determining that a heat element fault exists, the wear-leveling logic is configured to generate a control signal to energize a next heat element relay of the plurality of heat element relays that comprises the next lowest number of auxiliary heat cycles for which the next heat element relay has been energized.

DETAILED DESCRIPTION OF THE PREFERRED EMBODIMENTS

Figure 1:
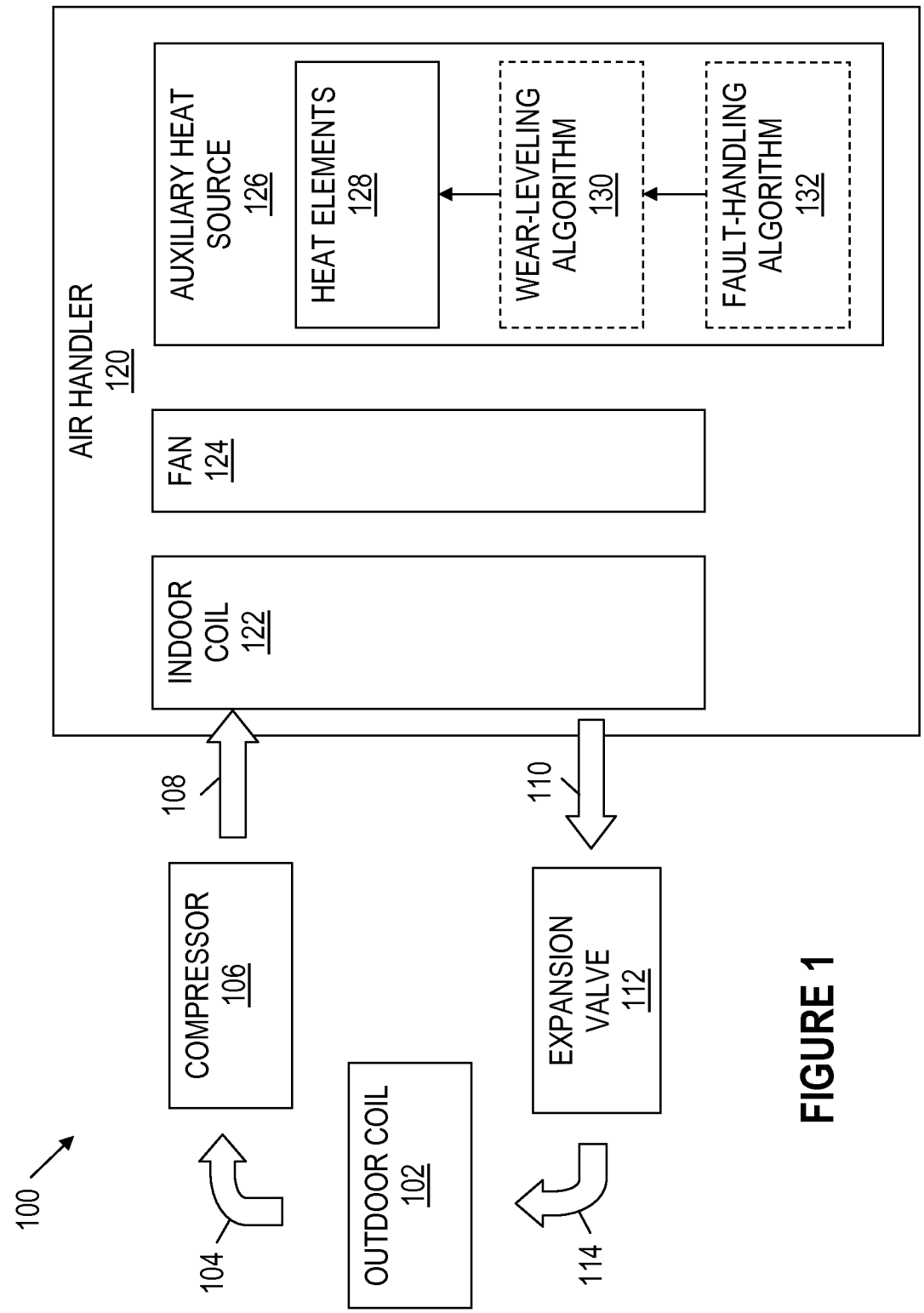
FIG. 1 illustrates a heat pump system in accordance with an embodiment of the disclosure.

In the description which follows like parts are marked throughout the specification and drawings with the same reference numerals, respectively. Certain features of the embodiments may be shown in somewhat generalized or schematic form in the interest of clarity and conciseness. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

FIG. 1 illustrates a heat pump system 100 in accordance with an embodiment of the disclosure. In the heat pump system 100, refrigerant cycles through outdoor coil 102, compressor 106, indoor coil 122 and expansion valve 112. The arrows 104, 108, 110 and 114 show the direction of flow for refrigerant in a heating cycle.

More specifically, in a heating cycle, the outdoor coil 102 causes refrigerant to evaporate. As the liquid refrigerant evaporates it pulls heat from the outside air. The gaseous refrigerant flows (arrow 104) from the outdoor coil 102 to compressor 106, where the gaseous refrigerant is compressed to produce a high-pressure, superheated refrigerant vapor. The vapor leaves compressor 106 and flows (arrow 108) to the indoor coil 122. At the indoor coil 122, air from fan (blower) 124 removes heat from the vapor (warming the indoor air) and, when enough heat is removed, the vapor condenses into a high-pressure liquid. This high-pressure liquid flows (arrow 110) from the indoor coil 122 to the expansion valve 112, which meters the flow (arrow 114) of the high-pressure liquid to the outdoor coil 102. The heating cycle process described herein can be repeated as needed. For example, the heating cycle of heat pump system 100 may be activated and/or maintained in response to a thermostat control signal.

As shown in FIG. 1, the indoor coil 122 and the fan 124 may be components of an air handler 120. The air handler 120 also comprises an auxiliary heat source 126, which is activated as needed. As an example, the auxiliary heat source 126 may be activated in response to detecting that the indoor temperature has dropped during a heating cycle of the heat pump system 100. Additionally or alternatively, the auxiliary heat source 126 may be activated in response to detecting that the heat pump heating cycle is not functional or is unavailable (e.g., during a defrost cycle). In other words, the auxiliary heat source 126 is typically activated when the heat pump heating cycle is insufficient or is unavailable. This is because the heat pump heating cycle is more energy efficient than operating the auxiliary heat source 126. If desired, the auxiliary heat source 126 could be implemented as a stand-alone heat source instead of being a complementary heat source for the heat pump system 100.

As shown, the auxiliary heat source 126 comprises heat elements 128 configured to convert electricity to heat. For example, the heat elements 128 may correspond to resistive metallic wires. Such resistive metallic wires may be formed as different sizes and shapes (e.g., ribbon, straight or coiled) of a single metal or combination of metals. The heat elements 128 may additionally or alternatively be comprised of ceramic material. To summarize, heat elements 128 may vary with respect to material, size and/or shape. Further, different heat elements 128 may vary with respect to cost, efficiency, durability and/or power rating. Accordingly, there are many possible variations of the air handler 120, or the auxiliary heat source 126 used therein.

As one example, the auxiliary heat source 126 may be comprised of 3 or 4 heat elements 128, which are selectively energized by 208 Volt 3-phase power or 230-240 Volt single-phase power. The heat elements 128 implemented in the auxiliary heat source 126 each have a predetermined power rating corresponding to a desired auxiliary heat capacity. In accordance with various embodiments, some or all of the heat elements 128 may be energized simultaneously during an auxiliary heat cycle as long as total amount of power/heat does not exceed a predetermined safety threshold. To ensure compliance with safety regulations, the auxiliary heat source 126 also may comprise safety devices (not shown) such as circuit breakers and thermal-protective devices (cycling or non-cycling). Further, multi-stage operation of the heat elements 128 during an auxiliary heat cycle may be used. Such multi-stage operations are implemented, for example, if the total power rating of the auxiliary heat source 126 during an auxiliary heat cycle exceeds a predetermined threshold (e.g., 10 kW). In some embodiments, the auxiliary heat source 126 limits current draw by the heat elements 128 to 40 amps, which may correspond to two heat elements 128 operating simultaneously. As previously noted, embodiments may vary and thus the examples given are not intended to limit other embodiments.

In accordance with at least some embodiments, the auxiliary heat source 126 implements a wear-leveling algorithm 130 to cycle use of the heat elements 128 so that deterioration of the heat elements 128 (due to their use) is more evenly distributed over time. The wear-leveling algorithm 130 also may apply to the switch mechanism for each of the heat elements 128. Assuming that not all of the heat elements 128 are needed for each heat request cycle, the wear-leveling algorithm 130 extends the overall lifespan of the heat elements 128. Further, the wear-leveling algorithm 130 enables the auxiliary heat source 126 to utilize smaller, cheaper switching mechanisms to power on/off each of the heat elements 128. As an example, relays may be used instead of contactors. Although several embodiments herein describe relays for the switching mechanism, contactors could alternatively be used. In some embodiments, each of the heat elements 128 has a separate relay (or contactor) as will later be described for FIG. 2. Implementing the wear-leveling algorithm 130 with the auxiliary heat source 126 also extends the life of such relays.

In response to a heat request to the auxiliary heat source 126, the number of heat elements 128 to be energized may vary. In other words, different heat requests may correspond to activating a different number of heat elements. For some auxiliary heat cycles, a single heat element 128 is selected by the wear-leveling algorithm 130. For other auxiliary heat cycles, two or more heat elements 128 are selected by the wear-leveling algorithm 130. As previously noted, heat elements 128 may be activated during an auxiliary heat cycle in one stage or multiple stages. Each auxiliary heat cycle may terminate after a fixed period of time (e.g., 1 minute, 5 minutes, etc). Alternatively, each auxiliary heat cycle may terminate once a desired result is achieved (e.g., a desired temperature is reached, a predetermined amount of energy/current is expended, etc.).

In at least some embodiments, for each auxiliary heat cycle, the wear-leveling algorithm 130 determines which of the heat elements 128 has been used the least and then selects this least-used heat element to be energized for the current auxiliary heat cycle. If multiple heat elements 128 are needed for a single auxiliary heat cycle, the wear-leveling algorithm 130 selects multiple heat elements 128 based on the same criteria (the least-used). In order for the wear-leveling algorithm 130 to select a least-used heat element 128 as disclosed herein, a technique for tracking use of the heat elements 128 is needed.

In accordance with at least some embodiments, use of a given heat element 128 can be tracked by counting the number of auxiliary heat cycles in which the given heat element 128 is selected or energized. These counts are stored for each of the heat elements 128 and are accessed by the wear-leveling algorithm 130 as needed for selection of a next heat element 128. Additionally or alternatively, the wear-leveling algorithm 130 may track the total runtime of each heat element 128 (different auxiliary heat cycles result in different runtimes for the heat elements 128) and may use the tracked runtime information when determining which heat element to energize.

The selection process performed by the wear-leveling algorithm 130 may be performed in response to a heat request received by the auxiliary heat source 126. For example, the heat request may provide information regarding how many heat elements 128 will be needed for an auxiliary heat cycle and whether multi-stage activation of heat elements 128 will be used. For some embodiments, the number of heat elements 128 to be used and their activation for each auxiliary heat cycle is fixed. In such cases, the selection of the next heat element to be energized can be performed before a heat request is received.

The auxiliary heat source 126 also may implement a fault-handling algorithm 132. The fault-handling algorithm 132 operates to detect when a selected heat element for an auxiliary heat cycle does not operate properly. The fault may be related, for example, to the heat element 128 itself, the switch on/off mechanisms, the conductive lines between the power source and the selected heat element, cycling thermal cut-out devices (thermostatic switches) and/or fuses. The detection mechanism may correspond to voltage level detection, current level detection, temperature detection and/or other techniques to determine that a selected heat element is not generating heat as expected.

In accordance with at least some embodiments, the fault-handling algorithm 132 cooperates with the wear-leveling algorithm 130 to ensure accurate tracking regarding how many times each heat element 128 is used. For example, if the fault-handling algorithm 132 detects a fault, the wear-leveling algorithm 130 selects a next heat element for the auxiliary heat cycle. The process of detecting a fault with the fault-handling algorithm 132 and selecting a next heat element with the wear-leveling algorithm 130 can continue as needed. Further, the use-tracking information should be updated to reflect the results of an auxiliary heat cycle in which a fault is detected. As an example, for each detected fault, a count for the corresponding heat element is either not added to the use counts being tracked, or a previously added count may be taken away. By not adding to the counts of a heat element corresponding to a detected fault, the wear-leveling algorithm 130 will select the same heat element (still the least-used) for the next auxiliary heat cycle. In this embodiment, the auxiliary heat source will attempt to energize a previously faulty heat element for each subsequent auxiliary heat cycle. Alternatively, the fault-handling algorithm 132 may cause the wear-leveling algorithm 130 to avoid selection of a heat element 128 corresponding to a detected fault for a predetermined number of auxiliary heat cycles, or until a reset signal for the heat element is received.

Figure 2:
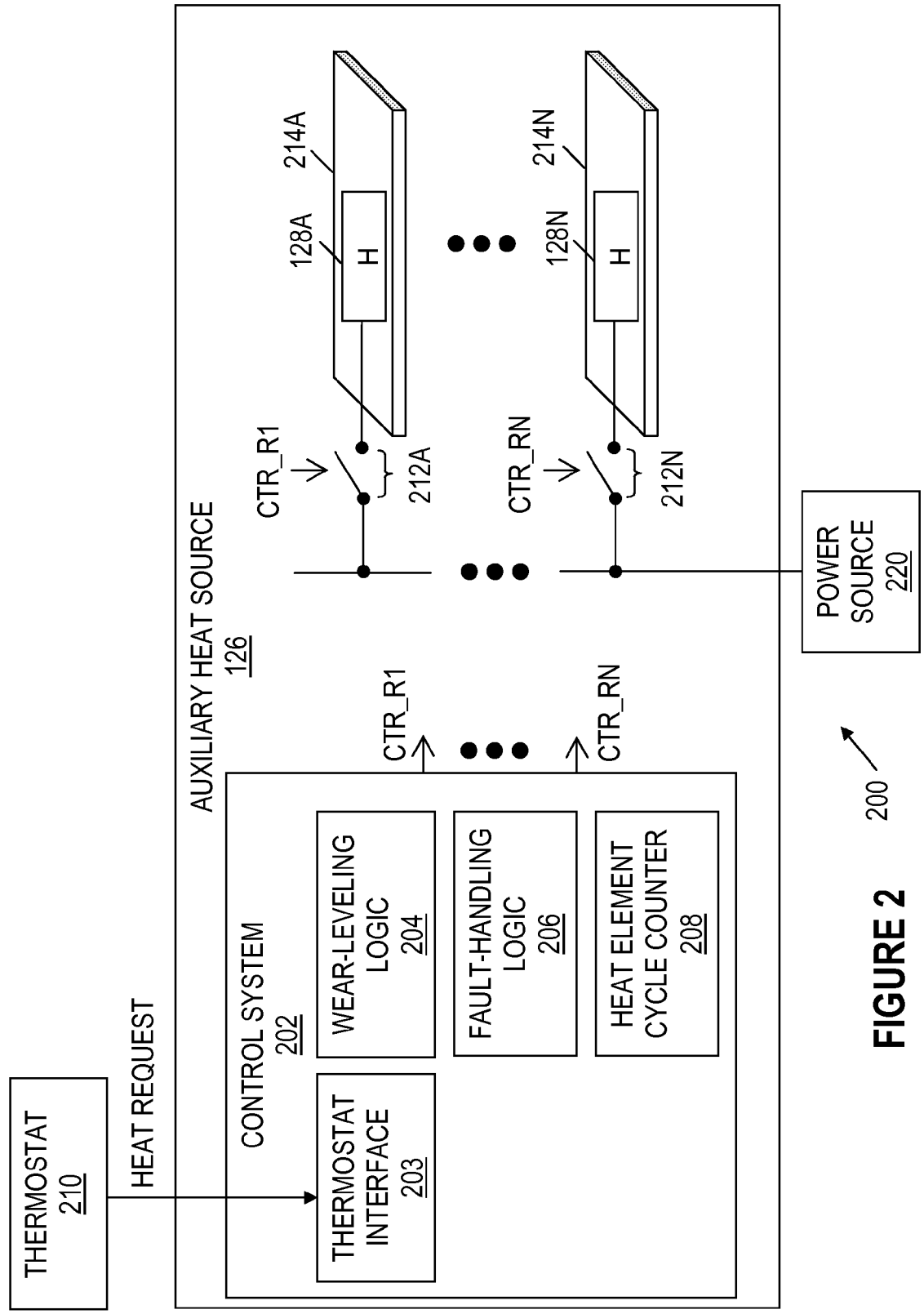
FIG. 2 illustrates an auxiliary heating system in accordance with an embodiment of the disclosure.

FIG. 2 illustrates an auxiliary heating system 200 in accordance with an embodiment of the disclosure. As shown, the auxiliary heating system 200 comprises an auxiliary heat source 126 coupled to a thermostat 210 and a power source 220. In operation, the auxiliary heat source 126 receives heat request signals from the thermostat 210. For example, the thermostat 210 may assert a heat request signal whenever the current temperature measured by the thermostat 210 drops below a desired temperature. Additionally or alternatively, the thermostat 210 may assert a heat request signal in response to a user request (regardless of temperature), or in response to a heat pump being unavailable (e.g., during a defrost cycle).

Upon receiving a heat request signal, the control system 202 is configured to carry out an auxiliary heat cycle corresponding to the heat request. During an auxiliary heat cycle, the control system 202 selects which of the heat elements 128A-128N will be energized by selectively closing switches 212A-212N. As shown, the control system 202 outputs switch control signals (CTR_R1 to CTR_RN) to control when the switches 212A-212N are opened or closed. When a given switch is closed (e.g., switch 212A), the corresponding heat element (e.g., heat element 128A) is energized by power from power source 220 and emits heat. In at least some embodiments, the switches 212A-212N may correspond, for example, to relays. Although the auxiliary heat source 126 of FIG. 2 shows a switch for each heat element, other embodiments may implement a switch for a pair of heat elements, or other configurations. Further, the heat elements 128A-128N may vary with respect to their power rating and thus the configuration of switches may vary as well (i.e., the power rating of the switches 212A-212N may or may not match the power rating of the heat elements 128A-128N). In some embodiments, each heat element 128A-128N is associated with a ceramic base 214A-214N, which electrically and thermally isolate the heat elements 128A-128N.

In FIG. 2, the control system 202 comprises wear-leveling logic 204, fault-handling logic 206, and heat element cycle counts 208. The control system 202 also comprises a thermostat interface 203 operable to receive heat requests from a thermostat 210 and to determine an action responsive to the heat request. The action determined (or received) by the thermostat interface 203 may, for example, include a number of heat elements to simultaneously energize. Additionally or alternatively, the heat request action cycle determined or received by the thermostat interface 203 may include staging (timing) parameters to energize a plurality of heat elements 128A-128N in a stepped manner.

In at least some embodiments, the wear-leveling logic 204 corresponds to a micro-controller with sufficient processing/memory capacity to perform the wear-leveling algorithm 130 described for FIG. 1. Similarly, the fault-handling logic 206 may correspond to a micro-controller with sufficient processing/memory capacity to perform the fault-handling algorithm 132 described for FIG. 1. Further, the heat element cycle counter 208 may correspond to a micro-controller with sufficient processing/memory capacity to perform the heat element cycle count operations described herein. In some embodiments, a relay cycle counter may be implemented instead of or in addition to the heat element cycle counter 208 (i.e., relay use rather than heat element use is tracked).

In at least some embodiments, the wear-leveling logic 204, the fault-handling logic 206, and the heat element cycle counter 208 may be combined on a single integrated circuit (IC). Alternatively, the wear-leveling logic 204, the fault-handling logic 206, and the heat element cycle counter 208 may be implemented using separate ICs. In either case, the wear-leveling logic 204, the fault-handling logic 206, and the heat element cycle counter 208 are configured to communicate with each other to output appropriate switch controls signals CTR_R1 to CTR_RN for an auxiliary heat cycle.

In response to a heat request from thermostat 210, the wear-leveling logic 204 accesses cycle count information tracked by the heat element cycle counter 208 for each of the heat elements 128A-128N. The wear-leveling logic 204 also may be configured to determine that only one heat element is available for use during the heat request action cycle and to expedite energizing the one heat element.

The wear-leveling logic 204 asserts at least one of the relay control signals (CTR_R1 to CTR_RN) based on accessed cycle count information. In other words, the wear-leveling logic 204 determines the least-used heat element as described herein and asserts the corresponding relay control signal (CTR_R1 to CTR_RN) to energize the least-used heat element for an auxiliary heat cycle responsive to the heat request. The wear-leveling logic 204 may operate to assert multiple relay control signals to energize multiple heat elements for an auxiliary heat cycle. In some embodiments, the wear-leveling logic 204 asserts multiple relay control signals for an auxiliary heat cycle in a multi-stage manner as described herein. The wear-leveling logic 204 also may communicate with the heat element cycle counter 208 to update the cycle count information for the heat elements 128A-128N. Alternatively, the heat element cycle counter 208 may monitor the operation of the switches 212A-212N to track the cycle count information for the heat elements 128A-128N. Alternatively, the heat element cycle counter 208 may receive information from sensors (e.g., temperature sensors, voltage sensors, current sensors) to track the cycle count information for the heat elements 128A-128N.

During an auxiliary heat cycle, the fault-handling logic 206 is configured to detect if a fault occurs that prevents a selected heat element from being energized as described herein. The fault-handling logic 206 may also communicate with the heat element cycle counter 208 and/or the wear leveling logic 204 to ensure accurate tracking regarding how many times each heat element 128 is used. For example, if the fault-handling logic 206 detects a fault, the wear-leveling logic 204 selects a next heat element for the auxiliary heat cycle. The process of detecting a fault with the fault-handling logic 206 and selecting a next heat element with the wear-leveling logic 204 can continue as needed. Further, the heat element cycle tracking information maintained by the heat element cycle counter 208 should be updated to reflect the results of an auxiliary heat cycle in which a fault is detected as described herein. As an example, for each detected fault, a count for the corresponding heat element is either not added to the cycle counts being tracked by the heat element cycle counter 208, or a previously added count may be taken away. By not adding to the counts of a heat element corresponding to a detected fault, the wear-leveling logic 204 will select the same heat element (still the least-used) for the next auxiliary heat cycle. In this embodiment, the auxiliary heat source will attempt to energize a previously faulty heat element for each subsequent auxiliary heat cycle. Alternatively, the fault-handling logic 206 may cause the wear-leveling logic 204 to avoid selection of a heat element, corresponding to a detected fault, for a predetermined number of auxiliary heat cycles, or until a reset signal for the heat element is received.

Figure 3:
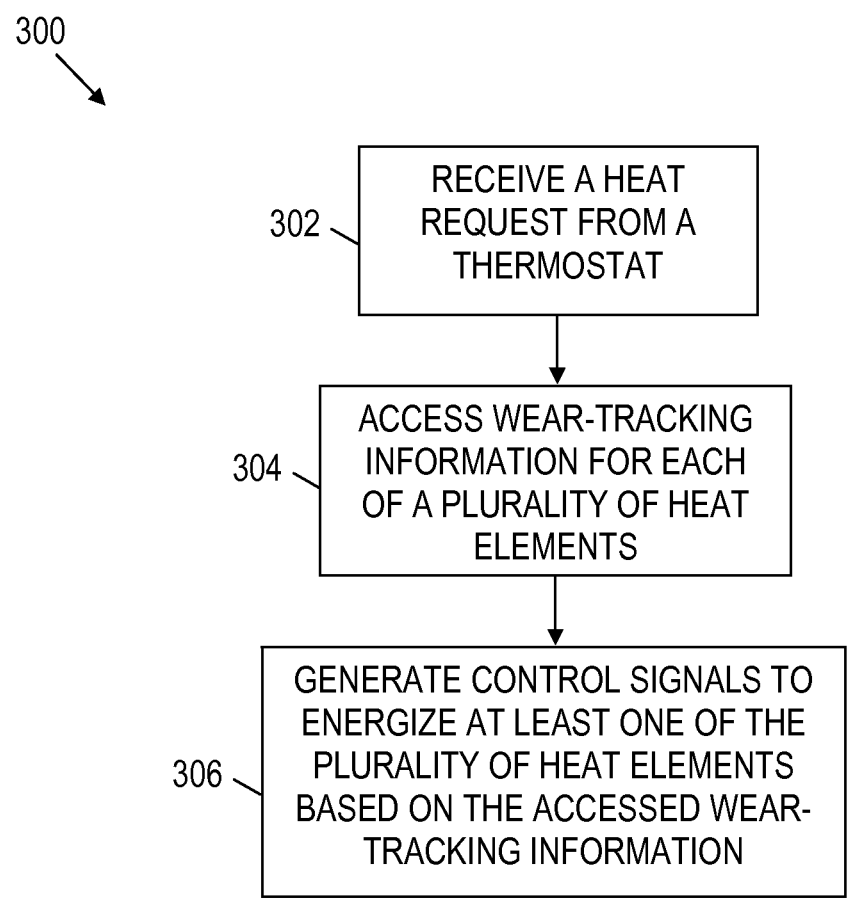
FIG. 3 illustrates a method for in accordance with an embodiment of the disclosure.

FIG. 3 illustrates a method 300 in accordance with an embodiment of the disclosure. The method 300 may be performed, for example, by an auxiliary heat source controller or control system. As shown, the method 300 comprises receiving a heat request from a thermostat (block 302). The method 300 further comprises accessing wear-tracking information for each of a plurality of heat elements (block 304). Finally, the method 300 comprises generating control signals to energize at least one of the plurality of heat elements based on the accessed wear-tracking information (block 306).

In at least some embodiments, the method 300 may additionally comprise determining a number of heat elements to energize in response to the heat request and applying, if necessary, a staging sequence for energizing the determined number of heat elements. The method 300 may additionally include updating the wear-tracking information to account for any heat elements energized in response to the heat request. The method 300 may additionally include detecting a heat element fault and avoiding updates to the wear-tracking information for a heat element corresponding to the heat element fault. The method 300 may additionally comprise determining whether only one heat element is available and, if so, expediting use of the one heat element in response to the heat request (i.e., cycle count information is only accessed if multiple heat elements or multiple relays are available for selection).

Figure 4:
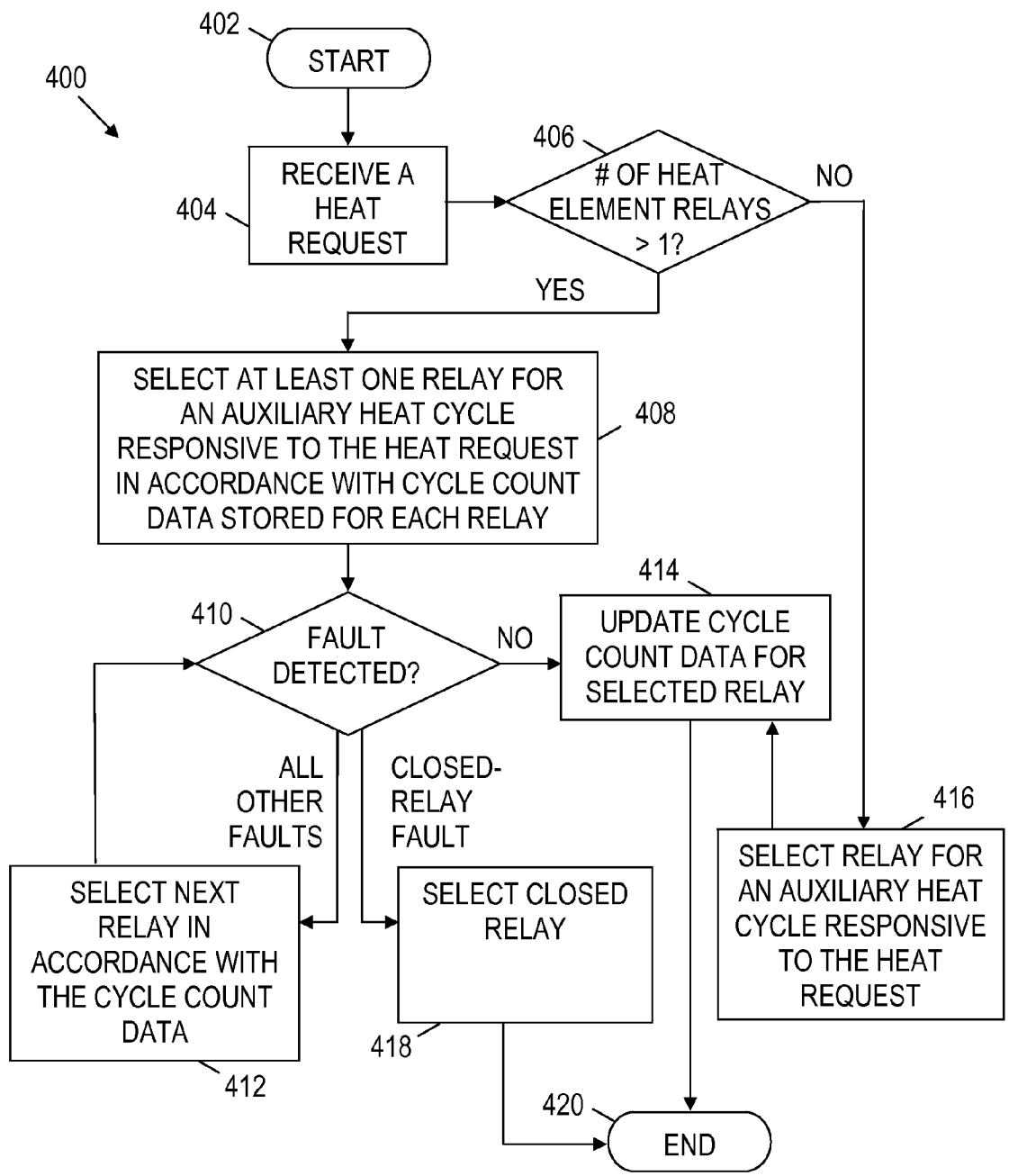
FIG. 4 illustrates a method for controlling heat element selection for an auxiliary heat source in accordance with an embodiment of the disclosure.

FIG. 4 illustrates a method 400 for controlling heat element selection for an auxiliary heat source in accordance with an embodiment of the disclosure. The method 400 may be performed, for example, by an auxiliary heat source controller or control system. As shown, the method 400 starts at block 402 and continues by receiving a heat request (block 404). The heat request may be received, for example, by a thermostat. If the number of heat element relays is not greater than one (determination block 406), the relay (i.e., the only relay available) is selected for an auxiliary heat cycle responsive to the heat request (block 416). The cycle count data for the selected relay is then updated (block 414) and the method ends at block 420. Updating the cycle count data when only one heat element is used enables wear-leveling to be performed should an additional heat element (or elements) be added to the system. For example, a new heat element may be selected by the wear-leveling algorithm until its cycle count data is the same as an older heat element (or elements).

If the number of heat element relays is greater than one (determination block 406), at least one of the relays is selected for an auxiliary heat cycle responsive to the heat request in accordance with cycle count data stored for each relay (block 408). For example, the cycle count data may be used to determine and select the least-used relay(s) for an auxiliary heat cycle responsive to the heat request.

If a closed-relay fault is detected (determination block 410), the closed relay is selected (block 418) and the method ends at block 420. If another type of fault is detected (determination block 410), a next relay is selected in accordance with the cycle count data (block 412) and the method 400 returns to determination block 410. If no fault is detected (determination block 410), the cycle count data is updated for the selected relay (block 414) and the method ends at block 420. In accordance with at least some embodiments, the updating of cycle count data in block 414 accounts for any faults detected. In other words, the cycle count data is not updated when selection of a faulty relay or a relay corresponding to a faulty heat element occurs.

Preferred embodiments have been described herein in sufficient detail, it is believed, to enable one skilled in the art to practice the embodiments. Although preferred embodiments have been described in detail, those skilled in the art will also recognize that various substitutions and modifications may be made without departing from the scope and spirit of the appended claims. For example, the components of the auxiliary heat source 126 may be replaceable and/or scalable. In other words, an old heat element and/or its switching mechanism may be replaced by new components. Similarly, new heating elements and their switching mechanisms may be added to increase the total heating capacity of an auxiliary heat source 126. Accordingly, the wear-leveling algorithm 126 described herein may account for replacement components and/or additional components. For example, the wear-leveling algorithm 130 could treat new components the same as old components or could treat new components differently (selecting new components more often than old components).

What is claimed is:

1. An air handler, comprising:
an auxiliary heat source having a plurality of heat element relays, wherein each heat element relay is associated with at least one heat element; and
a controller configured to:
receive a heat request from a thermostat;
access wear-tracking information for each of the plurality of heat element relays, wherein the wear-tracking information comprises the number of auxiliary heat cycles for which each of the plurality of heat element relays has been energized;
generate a control signal to energize a first heat element relay of the plurality of heat element relays that comprises the lowest number of auxiliary heat cycles for which the first heat element has been energized; and
determine whether a heat element fault exists, wherein in response to determining that a heat element fault exists, generating, by the controller, a control signal to energize a next heat element relay of the plurality of heat element relays that comprises the next lowest number of auxiliary heat cycles for which the next heat element relay has been energized.

2. The air handler of claim 1, wherein the controller is configured to determine a number of heat element relays to energize in response to receiving the heat request.

3. The air handler of claim 2, wherein the controller is configured to generate at least one control signal to simultaneously energize each of the number of heat element relays.

4. The air handler of claim 2, wherein the controller is configured to apply, if necessary, a staging sequence for energizing the determined number of heat element relays.

5. The air handler of claim 2, wherein the controller is configured to update the wear-tracking information to account for any heat element relay energized in response to the heat request.

6. The air handler of claim 2, wherein the controller is configured to determine whether only one heat element is available, and, if so, expedite the use of the one heat element by generating a control signal to energize the heat element relay associated with the one heat element that is available.

7. The air handler of claim 1, wherein the controller is configured to avoid updating wear-tracking information for any corresponding heat element relay in response to determining that a heat element fault exists.

8. The air handler of claim 1, wherein the controller is configured to take away an added count to the wear-tracking information for any corresponding heat element relay in response to determining that a heat element fault exists.

9. The air handler of claim 1, wherein the controller is configured to avoid selection of a faulty heat element corresponding to a previously detected heat element fault.

10. The air handler of claim 7 wherein the controller is configured to avoid selection of a faulty heat element corresponding to a previously detected heat element fault until a reset signal for the faulty heat element is received by the controller.

11. A control system for an auxiliary heat source of an air handler, the control system comprising:
a thermostat interface configured to receive a heat request from a thermostat and to determine an auxiliary heat cycle responsive to the heat request;
wear-leveling logic coupled to the thermostat interface, wherein the wear-leveling logic is configured to access wear-tracking information for each of a plurality of heat element relays, each heat element relay being associated with at least one heat element, and wherein the wear-leveling logic is configured to generate a control signal to energize a first heat element relay of the plurality of heat element relays that comprises the lowest number of auxiliary heat cycles for which the first heat element relay has been energized; and
fault-handling logic, wherein the fault-handling logic is configured to determine whether a heat element fault exists;
wherein in response to the fault-handling logic determining that a heat element fault exists, the wear-leveling logic is configured to generate a control signal to energize a next heat element relay of the plurality of heat element relays that comprises the next lowest number of auxiliary heat cycles for which the next heat element relay has been energized.

12. The control system of claim 11, wherein the auxiliary heat cycle determined by the thermostat interface includes a number of heat element relays to simultaneously energize.

13. The control system of claim 11, wherein the auxiliary heat cycle determined by the thermostat interface includes timing parameters to energize a plurality of heat element relays in a staged manner.

14. The control system of claim 11, wherein the wear-leveling logic is configured to determine a number of heat element relays to energize in response to receiving the heat request.

15. The control system of claim 14, wherein the wear-leveling logic is configured to generate a control signal to simultaneously energize each of the number of heat element relays.

16. The control system of claim 14, wherein the wear-leveling logic is configured to apply, if necessary, a staging sequence for energizing the determined number of heat element relays.

17. The control system of claim 11, wherein the wear-leveling logic is configured to update the wear-tracking information to account for any heat element relay energized during the auxiliary heat cycle.

18. The control system of claim 11, wherein the wear-leveling logic is configured to determine whether only one heat element is available for use during the auxiliary heat cycle, and, if so, expedite energizing the one heat element relay by generating a control signal to energize the heat element relay associated with the one heat element that is available.

19. The control system of claim 11, wherein the wear-leveling logic is configured to avoid updating the wear-tracking information for a corresponding heat element relay when the fault-handling logic determines that a heat element fault exists.

20. The control system of claim 11, wherein the wear-leveling logic is configured to take away an added count to the wear-tracking information for any heat element relay for a corresponding heat element relay when the fault-handling logic determines that a heat element fault exists.

21. The control system of claim 11, wherein the wear-leveling logic is configured to avoid selection of a faulty heat element corresponding to a previously detected heat element fault until a reset signal for the faulty heat element is received by the controller.

* * * * *